A. J. MASKREY, Jr.
FUEL FEEDER FOR FEEDING PULVERIZED FUEL TO FURNACES.
APPLICATION FILED MAR. 19, 1920.

1,362,026.

Patented Dec. 14, 1920.
2 SHEETS—SHEET 1.

INVENTOR
Arthur J. Maskrey, Jr.
BY Freas, Merkel, Saywell and Bond
ATTY'S.

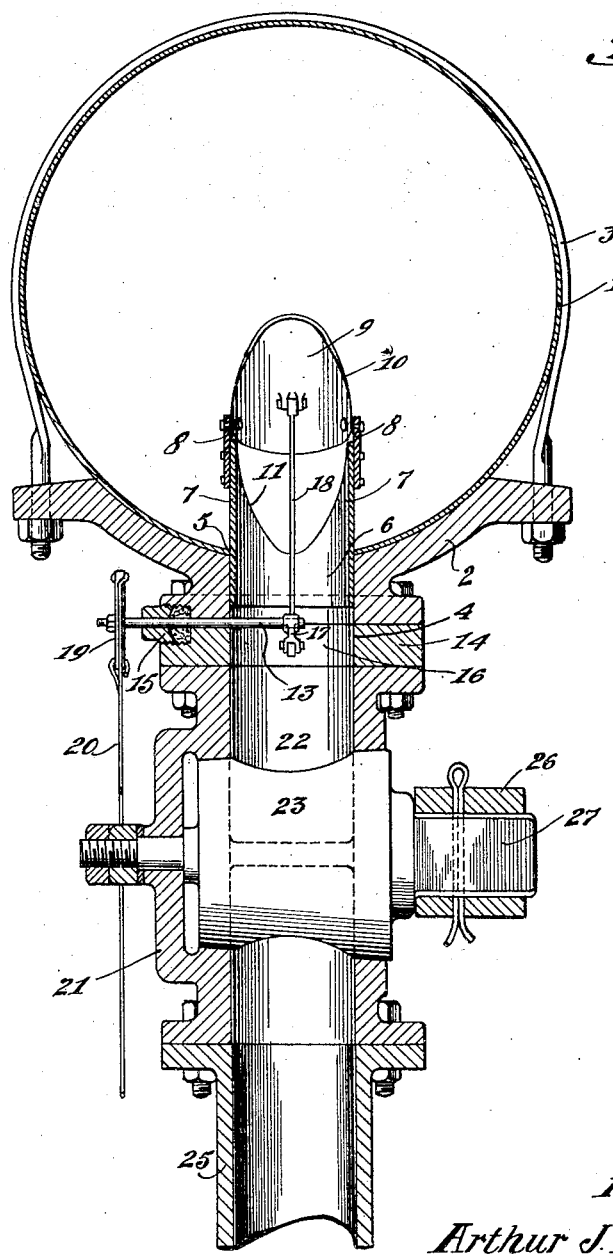

UNITED STATES PATENT OFFICE.

ARTHUR J. MASKREY, JR., OF CANTON, OHIO.

FUEL-FEEDER FOR FEEDING PULVERIZED FUEL TO FURNACES.

1,362,026. Specification of Letters Patent. Patented Dec. 14, 1920.

Application filed March 19, 1920. Serial No. 367,279.

*To all whom it may concern:*

Be it known that I, ARTHUR J. MASKREY, Junior, a citizen of the United States, residing at Canton, in the county of Stark and State of Ohio, have invented a new and useful Fuel-Feeder for Feeding Pulverized Fuel to Furnaces, of which the following is a specification.

This invention relates to fuel feeders for feeding pulverized fuel to furnaces and more especially to a regulator for controlling the amount of fuel fed from the main supply pipe to the feed pipe for each individual furnace independent of the amount of air fed to each individual fuel pipe to the main supply pipe.

The objects of the invention are to provide in a powdered fuel feed line a regulator within the main supply pipe adjacent each individual furnace feed pipe so arranged that the amount of powdered fuel to be fed from the main supply pipe to each individual feed pipe may be controlled independently of the amount of air conveyed to each feed pipe from the main supply pipe, the usual air valve being provided in each individual feed pipe for controlling the amount of air passing through the feed pipe.

It is a well known fact that where powdered fuel is carried through a supply pipe by means of compressed air the fuel is not evenly distributed through the entire interior of the supply pipe but travels in spirals, a considerable amount of the fuel moving close to the interior wall of the pipe at some points, while at other points little or no fuel is carried near the inner wall of the pipe.

For this reason it has been necessary in the past to erect baffles within the supply pipe adjacent to the individual feed pipe. As above stated the pulverized fuel travels in a spiral path through the interior of the supply pipe and for this reason the baffle plates located adjacent different feed pipes must necessarily be of different heights as in some instances a considerable amount of powdered fuel is carried close to the inner wall of the supply pipe at the point where a feed pipe is connected thereto where in other cases little or no powdered fuel is carried near the inner wall of the supply pipe at the points where other feed pipes are connected thereto. It thus requires considerable experimenting to determine the correct height for the baffle plate to be used in each instance.

After the necessary height for the baffle plate has been determined and the baffle plate placed in position the amount of powdered fuel fed to each feed pipe from the main supply pipe can only be reduced or increased by relatively reducing or increasing the amount of air passing from the supply pipe to the feed pipe.

It is well understood by those having experience in this art that it is often necessary to increase or decrease the amount of fuel without changing the amount of air passing through the feed pipe or to regulate the air without changing the amount of fuel passing through the feed pipe.

In the present invention the air is controlled independently of the powdered fuel and the regulator to which this invention pertains is arranged to regulate the amount of powdered fuel fed to each individual feed pipe independently of the air controlling means.

The invention thus set forth in general terms is illustrated in the accompanying drawings forming part hereof, in which—

Fig. 2 is a section on the line 2—2, Fig. 1.

A practical embodiment of the invention is disclosed in the accompanying drawings, forming a part of this specification in which similar numerals of reference indicate corresponding parts throughout the several views.

Figure 1:
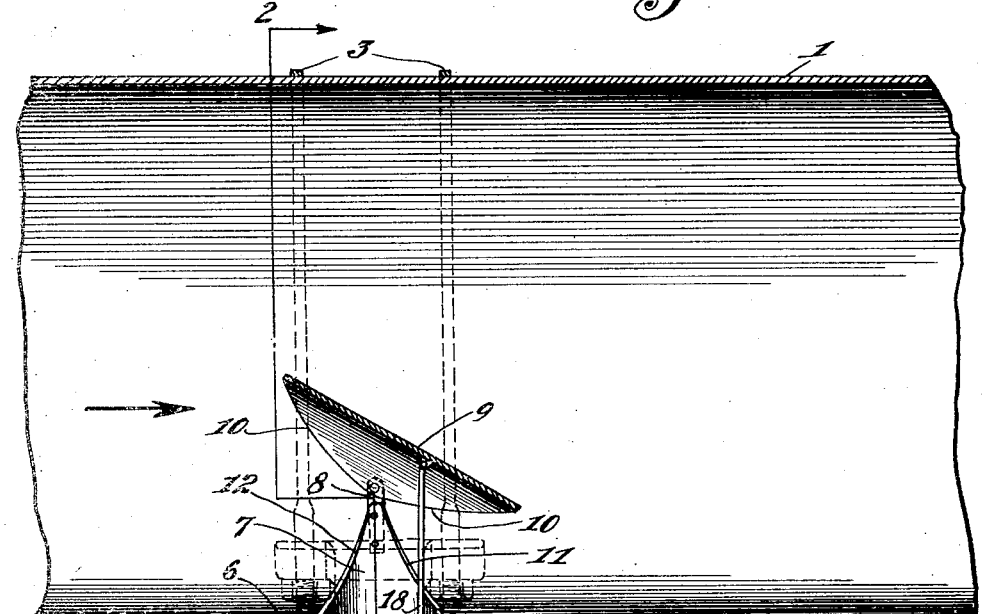
Figure 1 is a longitudinal section through a portion of the main supply pipe and an individual feed pipe showing the improved fuel regulator connected therewith.
Figure 3:
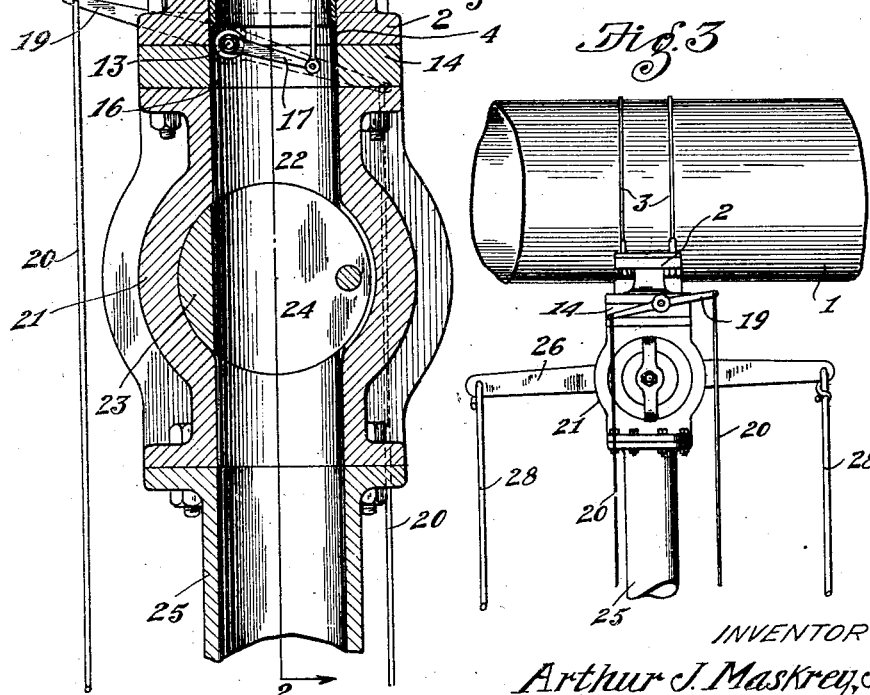
Fig. 3 is a side elevation of a portion of a main supply pipe and an individual feed pipe showing the opposite side from that shown in Fig. 1.

The portion of a main supply pipe through which powdered fuel is carried by means of an air blast is indicated at 1. A saddle 2 is connected to the supply pipe at the part where each individual feed pipe is attached thereto, U-bolts 3 being preferably provided for connecting the saddle to the supply pipe.

The saddle 2 is provided with a vertical bore which registers with the aperture 5 formed in the supply pipe 1. A cylindrical member 6 is mounted within the bore 4 of the saddle and provided upon opposite sides with the upwardly disposed portions 7 to the upper end of which are connected the ears 8.

The deflector 9 is substantially elliptical and of arcuate cross section, the curved edges 10 thereof being arranged to coincide with the curved edges 11 and 12 of the portions 7 upon the cylindrical member 6.

A shaft 13 is journaled in a bearing formed between the saddle and the block 14, a stuffing box 15 being provided around the shaft for the purpose of preventing air from leaking through the bearing. A bore 16, registering with the bore 4 in the saddle, is provided in the block 14.

A rock arm 17 is mounted upon the shaft 13 and a link 18 is pivotally connected to the extremity of said rock arm and to the deflector 9 at one side of the pivotal point thereof.

A lever 19 is connected intermediate its extremities to the shaft 13 and an operating wire 20 or the like depends downwardly from each end of said lever, these wires extending to a point where they may be conveniently grasped by the operator.

The usual air valve is connected to the block 14 comprises the casing 21 having a vertical bore 22 therein, which communicates with the bore 16 in the block 14, the block 23 of said valve having the usual channel 24 therein to provide communication between the supply pipe and the feed pipe 25, which feed pipe is connected to the lower end of the valve casing 21.

A lever 26 is mounted intermediate its ends upon the stem 27 of the plug 23, wires 28 or the like depending from the extremities of the said lever to a point within reach of the operator.

Assuming that the blast of air carrying the pulverized fuel is passing through the supply pipe 1 in the direction of the arrow shown in Fig. 1, the pulverized fuel striking the deflector 9 will be deflected downward through the valve and into the feed pipe 25, the air passing down through said feed pipe carrying the powdered fuel through the pipe. It will be seen that as the rock arm 17 is tilted downwardly the deflector 9 will be tilted at a greater angle deflecting a greater amount of powdered fuel into the feed pipe 25 and as the arm 17 is raised the deflector 9 will be tilted nearer to the horizontal deflecting less powdered fuel into the feed pipe. When the deflector is tilted to a horizontal position there will be practically no powdered fuel carried into the feed pipe and when the deflector rack arm 17 is tilted downwardly sufficient to move the deflector to a vertical position the maximum amount of powdered fuel will be deflected into the feed pipe. In order to cut off the powdered fuel to the minimum amount from the feed pipe, the rock arm 17 is raised sufficiently to tilt the deflector to a vertical position bringing the curved edge thereof into engagement with the curved edges 12 of the portions 7 of the cylindrical member 5.

If it is desired to increase or decrease the amount of air admitted to the feed pipe, the plug 23 is rotated accordingly, thus regulating the air without changing the amount of powdered fuel passing through the feed pipe, while the regulation of the deflector 9 is independent of the air valve and does not control the amount of air admitted to the feed pipe, the air and powdered fuel being thus individually controlled and regulated.

I claim:

1. In combination with a powdered fuel supply pipe and a feed pipe communicating therewith, a deflector within the supply pipe to deflect powdered fuel into the feed pipe and means for regulating said deflector to control the amount of fuel deflected to the feed pipe and a valve in the feed pipe for controlling the amount of air passing into the feed pipe from the supply pipe.

2. In combination with a supply pipe for conveying powdered fuel and a feed pipe communicating therewith, a deflector pivotally mounted within the supply pipe and means for operating said deflector to regulate the amount of powdered fuel fed to the feed pipe and a valve in the feed pipe for controlling the amount of air passing into the feed pipe from the supply pipe.

3. In combination with a supply pipe for converging powdered fuel and a feed pipe communicating therewith, a cylindrical member mounted within the feed pipe and provided with portions extending into the supply pipe, a transversely curved deflector pivoted upon said portion, and means for operating said deflector to control the amount of fuel deflected to the feed pipe.

4. In combination with a supply pipe for converging powdered fuel and a feed pipe communicating therewith, a cylindrical member mounted within the feed pipe and provided with portions extending into the supply pipe, a transversely curved deflector pivoted upon said portion, and a link pivotally connected to said deflector at one side of the pivotal point for operating the deflector to control the amount of fuel deflected to the feed pipe.

In testimony that I claim the above, I have hereunto subscribed my name.

ARTHUR J. MASKREY, Jr.